United States Patent

[11] 3,551,599

[72] Inventor Wayne H. White
Reynoldsburg, Ohio

[21] Appl. No. 724,383
[22] Filed Apr. 26, 1968
[45] Patented Dec. 29, 1970
[73] Assignee Bell Telephone Laboratories, Incorporated
Murray Hill and Berkeley Heights, N.J.
a corporation of New York

[54] AUTOMATIC MESSAGE ACCOUNTING SYSTEM TO INSURE THAT TRUNKS DESIRING TO BE INDENTIFIED FOR TIMING PURPOSES WILL NOT BE DEPRIVED OF ACCESS TO THE IDENTIFIER BY TRUNKS DESIRING TO HAVE AN INITIAL ENTRY RECORDED
6 Claims, 4 Drawing Figs.

[52] U.S. Cl. .......... 179/7.1
[51] Int. Cl. .......... H04m 15/18
[50] Field of Search .......... 179/7.1TP

[56] References Cited
UNITED STATES PATENTS

| | | | |
|---|---|---|---|
| 2,599,358 | 6/1952 | Cahill et al. .......... | 179/7.1 |
| 2,848,543 | 8/1958 | Breed et al. .......... | 179/7.1 |

*Primary Examiner*—Kathleen H. Claffy
*Assistant Examiner*—Jan S. Black
*Attorneys*—R. J. Guenther and James Warren Falk

ABSTRACT: Portions of an automatic message accounting system for recording the identity of a call-carrying trunk when the trunk is first called for use on a chargeable call and again when the times of answer and disconnect are to be recorded are disclosed. A trunk identifier circuit is used to identify the call-carrying trunks on each occasion. A preference reservation relay is provided and is operated when a timing entry requesting trunk operates the first of its identifier relays to insure that such a trunk will not be deprived of access to the recorder by another trunk requesting access merely to record an initial entry. In addition, circuitry is provided for preventing the loss of a timing entry if a trunk should time out after operating its identifier relays.

PATENTED DEC 29 1970 3,551,599

INVENTOR
W.H. WHITE
BY Howard R. Popper
ATTORNEY

AUTOMATIC MESSAGE ACCOUNTING SYSTEM TO INSURE THAT TRUNKS DESIRING TO BE INDENTIFIED FOR TIMING PURPOSES WILL NOT BE DEPRIVED OF ACCESS TO THE IDENTIFIER BY TRUNKS DESIRING TO HAVE AN INITIAL ENTRY RECORDED

BACKGROUND OF THE INVENTION

This invention relates to automatic message accounting systems for automatically assessing charges to customers using telephone communication facilities.

In charging and billing for the use of telephone facilities, a record is made which identifies the particular trunk used on the call and in some cases a record is also made to identify the directory number of the called telephone. One such system is disclosed in H. D. Cahill, a U.S. Pat. No. 2,599,358, issued Jun. 3, 1952. In the Cahill patent system, data pertaining to a particular call is recorded on three different occasions. On the first or initial entry, the directory number of the calling telephone and a two digit number identifying the trunk in use are recorded. On some initial entries, i.e., those relating to calls for which detail billing is to be performed, the called number will also be recorded. On the second entry, which is made after the connection has been established to the called station when the called party answers, there will be recorded the time of answer and, once again, the identity of the trunk involved. The third entry is made when either the called or calling party hangs up the receiver. The third entry contains the time of disconnect and the identity of the trunk involved.

While the Cahill patent system since its inception has operated satisfactorily in hundreds of telephone offices throughout the country, one particular difficulty has been noticed under heavy traffic conditions. It will be recalled that the recorder of the Cahill patent which controls the punching of the data entries on a paper tape is so adapted that it can be called into operation for use on many different calls which are simultaneously in progress. On some of these calls the recorder will be used to make initial entries while on others it will be called upon to make answer or disconnect entries. If a trunk carrying a call requires the use of the recorder to make an answer or disconnect entry and the recorder is busy working on another call, the trunk must wait until the recorder becomes available. The Cahill patent system was designed so that the telephone conversation would not be impeded by any delays in the call charge recording equipment. A trunk requesting access to the recorder for the purpose of recording the time at which the called party answers the call will wait as long as necessary if the recorder is busy. This means that some conversation may take place for an interval for which no charges are made. On the other hand, trunks are designed so that they will not indefinitely continue to request access to a recorder after the termination of a call. Most trunks will abandon the request for access to the recorder to record the time of disconnect after a waiting period of 2 to 5 seconds. The reason for this is that a trunk is a fairly expensive piece of equipment which must be available to carry another call as soon as possible. If the recorder cannot be seized during the prescribed interval, a timer in the trunk cancels the request. When this happens the time of disconnect is lost and the customer cannot be charged for the actual duration of the call. The accounting center equipment which reads the perforated tapes at a later time is therefore programmed to charge the customer for only a minimum length call when it finds an initial entry but cannot find both an answer and disconnect entry for the particular call. Of course, if no initial entry can be found on the tape, no charge whatsoever is made. While this occasional loss of revenue might be tolerated by the telephone operating company, the problem is somewhat more annoying because the automatic trouble indicating equipment, also described in the Cahill patent system, takes note of the fact whenever a trunk times out while requesting access to a busy recorder. This must be done because a time out may be indicative of an actual equipment trouble. This in turn initiates maintenance checking and repair procedures which are very costly to a telephone company. Thus, in addition to the loss of revenue on the call, the telephone company pays for a repairman to hunt for a nonexistent equipment failure.

Accordingly, it is an object of the present invention to improve the automatic assessment of charges in communications switching systems.

It is a further object of the present invention to assure the automatic and proper assessment of charges for the actual duration of a telephone call even under such heavy traffic conditions as may cause a call carrying trunk to time out while awaiting access to the recorder for recording the time of answer or disconnect.

The present invention proceeds from a realization of the fact that the identity of the trunk involved on a particular call must be recorded on three different occasions and that when different calls desiring access to the recorder to record different ones of these entries are involved, different priorities of access to the recorder must be accorded. To come extent this was appreciated in the Cahill system inasmuch as trunks which were requesting access to the recorder to record the times of answer or disconnect were given preference over trunks requesting access for the recording of an initial entry. In this manner the Cahill system attempted to prevent the loss of timing entries. However, under heavy traffic conditions it was possible in that system for timing entries to be lost despite the fact of the superior preference. It will be recalled that a circuit called the trunk identifier in the Cahill patent and also variously known in the art as the district junctor identifier or the call identity indexer was employed each time by the recorder to obtain the two digit designation of the trunk carrying the particular call being charged. The identifier relays in this trunk identifier circuit were operated directly by the trunk when the trunk requested access to the recorder for the answer or disconnect time entry. On an initial entry, however, a circuit known as the transverter is first called in by the sender associated with the call and the transverter in turn is connected to the recorder to furnish it with the other additional information required on initial entries. The transverter is a circuit which receives the identity of the calling line from the sender in terms of the calling line's equipment location number in the switching network. The transverter furnishes the equipment location to a translator, which obtains the corresponding directory number and then registers the directory number preparatory to transmitting it to the recorder. The identity of the calling trunk is recorded as the last item of information on an initial entry. The calling trunk identity is used on all three entries to identify them as pertaining to the same call. When the trunk identifier is in use by the transverter all other trunks are prevented from operating their identifier relays. This is accomplished by having the recorder remove an enabling ground from these trunks when seized by the transverter. In so doing, however, an access problem was created for trunks which had timing entries, because instead of one of these trunks receiving access to the recorder, it was possible for another transverter to seize the recorder. Under heavy traffic conditions it was possible for a number of such transverters to be served and for timing entry requesting trunks to time out.

SUMMARY OF THE INVENTION

I have discovered a way to prevent timing entry requesting trunks from being ignored by the recorder when the recorder becomes available after serving a transverter.

My invention takes advantage of the fact that the recorder is released by a transverter in a somewhat different manner than it is released by a timing entry requesting trunk. I take advantage of the different manner in which the recorder is released to prevent the recorder from being reseized by another transverter when the recorder is in the process of being released after serving a first transverter. On the other hand, I prevent a second timing entry requesting trunk from seizing the recorder when the recorder is in the process of completing its work for a first trunk so that transverters and trunks may alternately obtain access to the recorder even under heavy traffic conditions. When the recorder is in the process of finishing its work for a particular transverter and a trunk having a timing entry operates its identifier relay in the trunk identifier circuit, a preference reservation relay will now also be operated in the recorder. Contacts of this preference reservation relay will prevent the recorder from being connected to any transverter. If, after operating the preference reservation relay, a trunk which has been awaiting access nevertheless times out, contacts of the reservation relay lock in the operated identifier relays of the trunk identifier circuit so that the identity of the trunks will not be lost and a complete timing entry will be recorded for the call.

Accordingly, a feature of the present invention is the provision of circuitry for taking advantage of the different manners in which the recorder is released by the timing entry requesting trunks and by the transverters to prevent reseizure of the recorder by another one of the same type of circuits it has just finished serving when a circuit of the other type is waiting.

BRIEF DESCRIPTION OF THE DRAWING

The foregoing objects and other features may become more apparent from a reading of the detailed specification together with the drawing in which:

FIGS. 1—3 are to be arranged.

GENERAL DESCRIPTION

Figure 1:
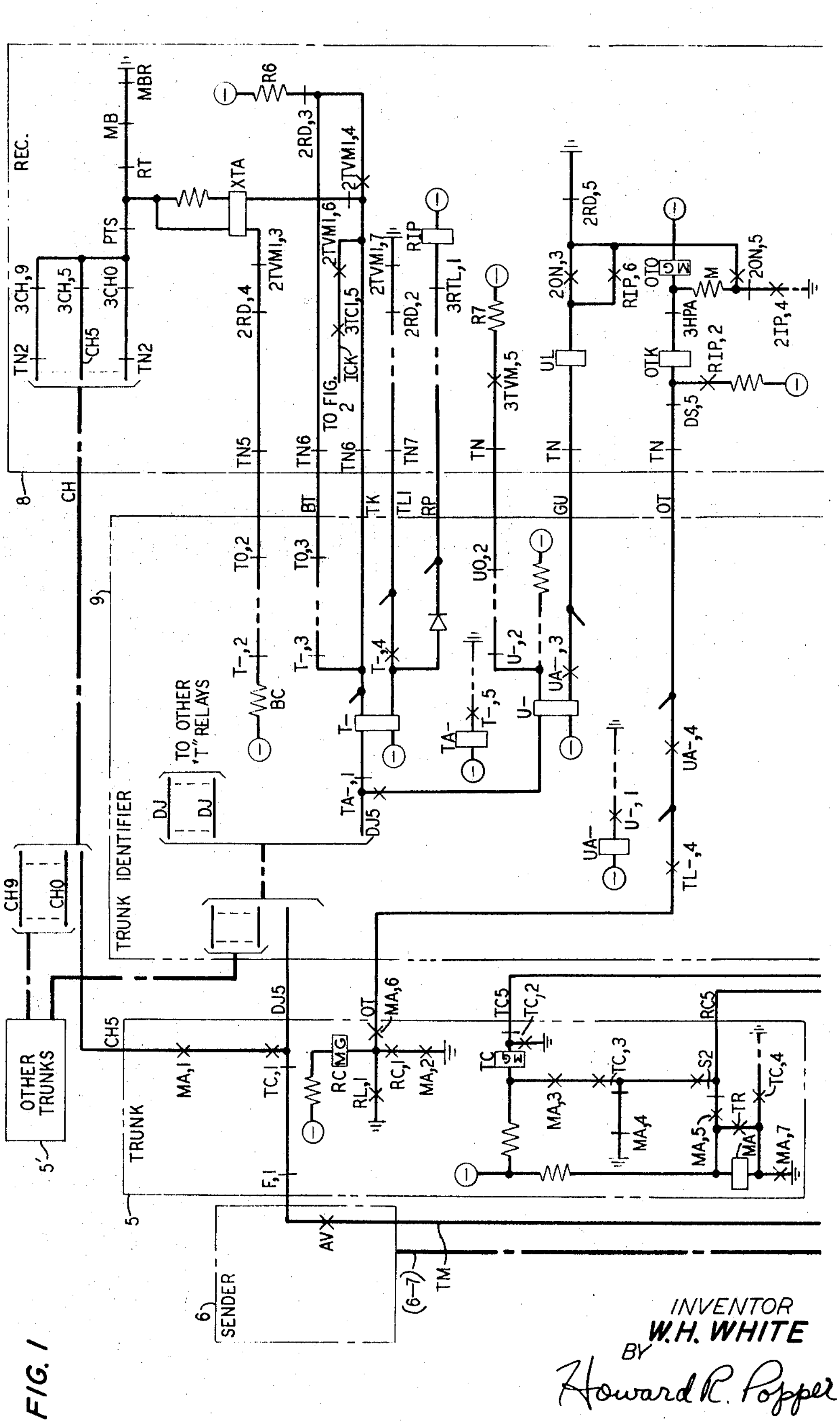
FIG. 1 shows a simplified drawing of the sender and trunks and a portion of the trunk identifier and recorder circuits of the automatic message accounting telephone switching system modified according to the principles of the present invention.

When a call is placed, a connection will be established from a calling line (not shown) through the switching network (not shown) to one of trunks 5, 5′, FIG. 1. A sender 6 will be connected to the trunk and the call signaling information needed on the call will be transferred to the sender. The details of this operation are well-known and many switching systems are available for performing this function. To assess charges for such a call an automatic message accounting system may be employed. In the above-mentioned Cahill patent system, for example, when sender 6 has recorded the call signaling information, it seizes a transverter 7 (FIG. 2) and transmits to it the identification of the calling line in terms of the calling line's equipment location on the frames of the switching network and certain other information not relevant to the present invention. The transverter 7 seizes a translator (not shown) to convert the calling line's equipment location into the calling line's directory number and the transverter then registers the calling line's directory number on relays therein (not shown). At this point transverter 7 attempts to seize the recorder 8 by operating its respective one of transverter preference relays 3TP1 through 3TP0 in FIG. 3. If this relay can be operated, the recorder is connected to the transverter and four cut-in relays (not shown) are successively operated in the transverter. The first two of these four cut-in relays pass the called number digits from sender 6 through cable (6– 7) and transverter 7 to recorder 8 over cable (7–8). Each time recorder 8 obtains suitable information it passes it to perforator 8A over cable (8–8A). Perforator 8A punches the information onto a paper tape. The third of these cut-in relays passes the calling directory number from the transverter to the recorder and the fourth of these successively operated cut-in relays connects the recorder to trunk identifier 9 so that the recorder may record a two digit designation to identify the trunk carrying the call. The other entries relating to this call will thereafter be identified by means of this trunk designation. Thereafter, the recorder releases the transverter and the trunk identifier and is available to be used on another telephone call.

What has just been generally and briefly described is the recording of an initial entry. Subsequently, the recorder will be employed to record the time at which the called party answers, and after the termination of the call, the time at which the connection between the calling and called party through the switching network is discontinued. This is called the time of disconnect. When the recorder is needed to record an answer or disconnect time entry, the timing entry requesting one of the trunks 5, 5′ attempts to operate its respective T— and U— relays in trunk identifier 9, FIG. 1. The trunk will be able to do so if trunk identifier 9 is not being used by transverter 7. If the trunk can operate its respective identifier relays, trunk identifier 9 will be connected to recorder 8 and pass to it the respective trunk designation. At the same time, the recorder obtains the time from the master timer (not shown) and controls perforator 8A, FIG. 3, to punch the time of the answer or disconnect on the paper tape. The manner in which the present invention modifies the foregoing operations so that after the recorder has completed serving either the trunk identifier circuit or one of the transverter circuits, it cannot again be seized by another circuit of the same type, will be apparent from the following detailed description.

DETAILED DESCRIPTION

Seizure of the Recorder for Initial Entry

Figure 2:
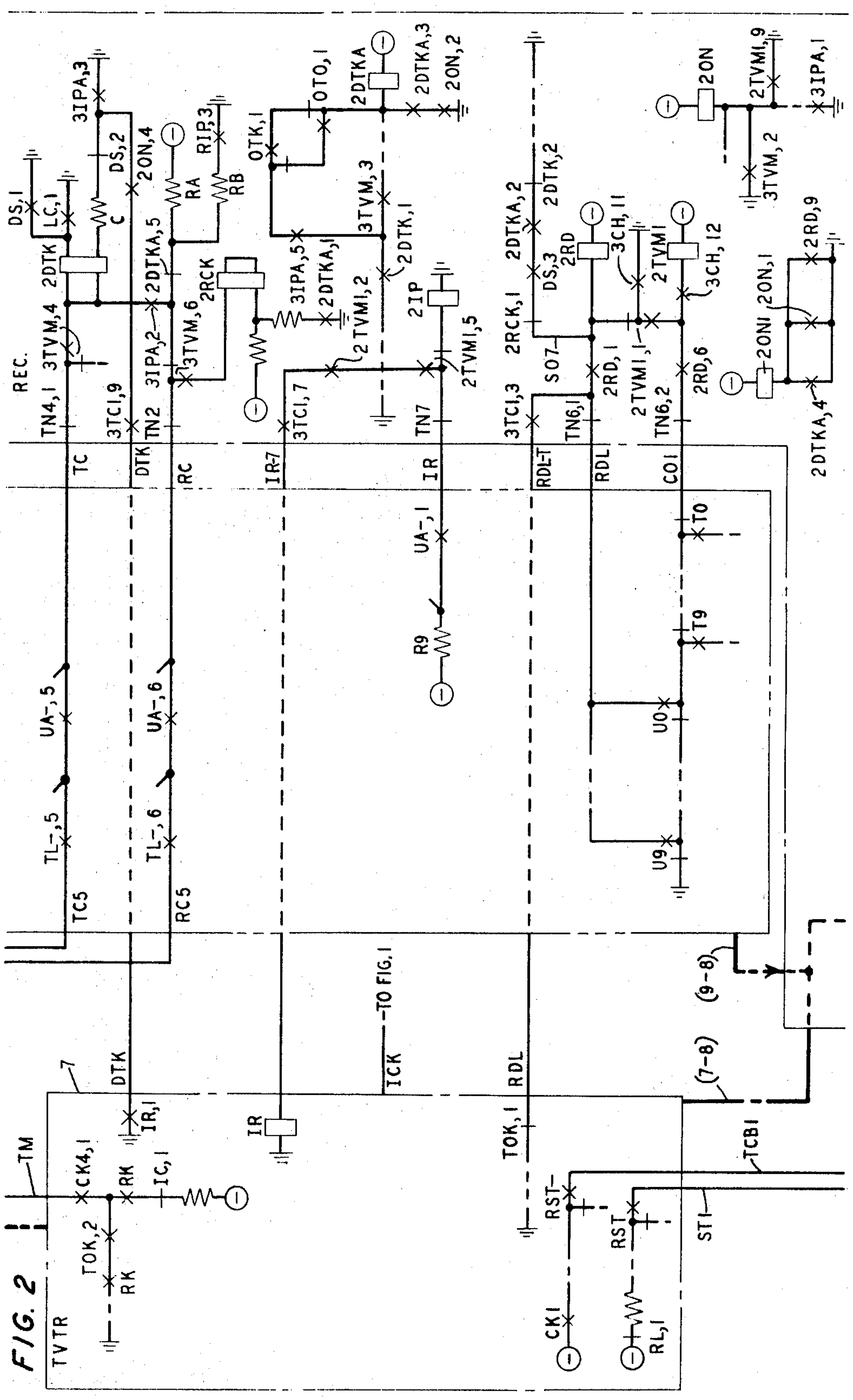
FIG. 2 shows a simplified drawing of the transverter, the remainder of the trunk identifier and a further portion of the recorder.

When transverter 7, FIG. 2, is seized by sender 6, FIG. 1, incident to the initiation of a call involving trunk 5, transverter 7 applies resistance battery to start lead ST1. If relay 21P, FIG. 2, is normal, relay 3TP1 in FIG. 3 will be operated by the resistance battery on lead ST1. The operating path includes back contact TN,1, the winding of relay 3TP1, back contact HP,1 and back contact 21P,1 to ground. In the drawing, each relay in recorder 8 will be numbered according to the FIG. in which its winding appears and its contacts will be individually numbered and separated from the relay designation by a comma. Transverter preference relay 3TP1 operated, locks to ground over the make contact of its transfer contacts 3TP1,1. At the back contact of transfer contacts 3TP1,1 the ground enabling path to the remaining transfer preference relays 3TP0 through 3TP— is interrupted. Transverter preference relay 3TP1 at the make contacts of its transfer contacts 3TP1,2 completes a ground operating path to the winding of transverter connector relay 3TC1. This path may be traced from ground, back contact RIP,1 of the preference reservation relay RIP (whose winding is shown in FIG. 1), the back contact of transfer contacts 3MTP,2, the make contact of transfer contacts 3TP1,2, back contact 20N1,1, to the winding of relay in 3TC1. Relay 3TC1 operates and locks over its make contact 3TC1,1 in parallel with back contact 20N1,1. At its make contact 3TC1,2 relay 3TC1 operates relays 3CH and 3TVM. Relay 3TC1 at others of its work contacts (not shown) closes through the necessary leads for transverter 7 to control the perforation of the initial entry on the paper tape. In addition, as explained in the aforementioned Cahill patent, the recorder connector relay operates an RK relay (not shown) as an indication that the recorder has been connected to the transverter. Throughout the remainder of the detailed description, the operating paths for the windings of those relays not necessary to the description of the invention will not be described in detail and the work contacts of relays which are mentioned but which are not essential to the understanding of the invention will also be omitted from reference.

When transverter 7 is connected to recorder 8 for an initial entry it is necessary to prevent trunks having timing entries from seizing the recorder. Timing entry requesting trunks initiate a bid to seize recorder 8 by operating their identifier relay in trunk identifier 9 (FIG. 1) using a ground supplied on a CH lead from recorder 8. Back contacts 3CH,0 through 3CH,9 in FIG. 1 prevent the application of ground to these CH leads. However, the trunk involved with the call employing transverter 7 can operate its identifier relay by receiving a ground through sender 6 which the transverter applies over lead TM as hereinafter described.

Relay 3CH, previously described as having been operated at its make contact 3CH,11 in FIG. 2 operates relay 2RD over a path including a back contact of transfer contacts 2TVM1,1. Relay 2RD operated locks over its make contact 2RD,1 to the ground which transverter 7 provides on lead RDL. At its back contact 2RD,2 in FIG. 1, relay 2RD removes ground from lead TL1 and at its back contact 2RD,3 removes resistance battery from lead BT. Removal of ground and battery from the TL1 and BT leads, respectively, releases any T− or U− identifier relay that may have been operated in trunk identifier circuit 9. When all the identifier relays in trunk identifier circuit 9 are normal, recorder relay 2TVM1 in FIG. 2 is operated by a ground which trunk identifier 9 applies to lead C01. The operating path includes back contact TN6,2, make contact 2RD,6 and make contact 3CH,12. Relay 2TVM1 operated, at the back contact of its transfer contacts 2TVM1, 5, opens the operating path to relay 21P and at its make contact prepares a path to connect resistance battery R9 from trunk identifier circuit 9 to lead IR-7. This path will be employed at the completion of trunk identification. (At that time trunk identifier 9 will operate relay UA− in FIG. 1. Relay UA− at its operated make contact in series with lead IR-7 in FIG. 2 will complete the application of resistance battery to this prepared path.) At its back contacts 2TVM1,3 and 2TVM1,4, in FIG. 1, relay 2TVM1 opens the path to the left- and right-hand winding of relay XTA. At the make contact of transfer contacts 2TVM1,4, a path is prepared for the winding T− identifier relay in trunk identifier circuit 9 over lead TK to resistance battery R6 in recorder 8. This path will be completed upon the release of back contact 2RD,3. Relay 2TVM1 operated at its make contact 2TVM1,9 in FIG. 2 operates relay 2ON. Relay 2ON is the recorder off normal relay. Relay 2ON operated at its make contact 2ON,1 in turn operates relay 2ON1.

Relay 2TVM1 operated at its make contact 2TVM1,6 in FIG. 1 connects lead TK via make contact 3TC1,5 of the transverter connector relay 3TC1 to transverter lead ICK. Circuits (not shown) in transverter 7, FIG. 2, associated with lead ICK check the continuity of the identifier loop path from the transverter through sender 6, trunk identifier 9 and recorder 8. In so doing, these circuits operate the transverter IC relay (winding not shown) one of whose back contacts IC,1 (FIG. 2) removes resistance battery from transverter lead TM. At the same time, relay TOK in the in the transverter (winding not shown) operates and at its back contact TOK,1 in FIG. 2 removes ground from lead RDL causing recorder relay 2RD to release. Release of relay 2RD with relay 2TVM1 still operated causes recorder resistance battery R6 in FIG. 1 to be applied to the trunk identifier 9 over lead TK. Resistance battery on the TK lead enables the T− identifier relay in trunk identifier circuit 9 to be operated via its upper winding over a path including resistance battery on lead TK, the upper winding of relay T−, back contact TA−, 1, lead DJ5, to trunk 5, the back contact of transfer contacts TC,1 and back contact F,1 in trunk 5, make contact AV in sender 6 and lead TM to transverter 7, FIG. 2. The transverter applies ground to lead TM over a path including make contact TOK,2 and make contact CK4,1. The operation of relay CK4 is described in the aforementioned Cahill et al. patent.

Identifier relay T− operated in FIG. 1 at its make contact T−,1 completes an operating path to the winding of relay TA−. Relay TA− at the make contact of its transfer contacts TA−,1 transfers the DJ lead to the upper winding of the U− relay associated with the particular trunk using the transverter on this call. Relay U− operates and at its make contact U−,1 operates units auxiliary relay UA−. The details of the lockout chain associated with the windings of the units auxiliary relays are not shown since they are not essential to an understanding of the invention. Relay UA− operated at its make contact UA−,3 prepares a locking path from the lower winding of relay U− to lead GU. This path will be completed by the operation of off-normal contact 2ON,3 in recorder 8.

The operation of identifier relays T− and U− in trunk identifier 9 provides a two-digit designation of the trunk which is employing transverter 7 and recorder 8 to record the initial entry. Work contacts (not shown) of these T− and U− relays enter the trunk designation into recorder 8 via cable (9–8), FIG. 2, where the information is forwarded over contacts of the fourth sequentially operated cut-in relay (not shown) in the recorder to perforator 8A over cable (8–8A). When the trunk (assumed to be trunk 5) employing the transverter has operated its units auxiliary UA− relay in identifier 9, relay 2DTK in the recorder is operated over a path including resistance battery and talking charge relay TC in trunk 5, FIG. 1, lead TC5 to identifier 9, FIG. 2, make contacts TL−,5 and UA−,5, lead TC to recorder 8, back contact TN4,1, make contact 3TVM,4, the lower winding of relay 2DTK, resistance C, back contact DS,2, make contacts 2ON,4 and 3TC1,9, lead DTK to transverter 7, make contact IR,1 and ground. The talking charge relay TC in trunk 5, FIG. 1, does not operate due to the high resistance in this circuit. However relay 2DTK operates, operating relay 2DTKA over a path including ground, make contact 2DTK,1 and make contact 3TVM,3. Relay UL in FIG. 1 now operates over a path from battery, the lower winding and make contact UA−,3 of trunk identifier 9, FIG. 1, lead GU, a back contact of relay TN, the winding of relay UL, make contact 2ON,3 and back contact 2RD,5 to ground.

Trunk 5 also applies ground to lead RC5 which may be traced in trunk 5 from ground, back contacts MA,4 and TC,3 and a front contact of relay S2 to lead RC5. Ground on lead RC5 is continued over make contacts TL−,6 and UA−,6 of trunk identifier 9 to a back contact of relay TN2 in recorder 8 and a make contact of transfer contacts 3TVM,6 to the winding of relay 2RCK. Operation of relay 2RCK indicates that lead RC is continuous. In the event that the RC lead was crossed, the voltage divider resistance connected by make contact 2DTKA,1 to the lower winding of relay 2RCK would prevent relay 2RCK from releasing until a trouble entry was recorded and relay 3TVM released, releasing relay 2DTKA.

At this time relays OTK and OTO in FIG. 1 check the continuity of the OT lead. Relay OTK will operate if lead OT is crossed with battery while relay OTO will operate if lead OT is crossed with ground. The operation of either relay by its work contacts (not shown) would prevent further progress of circuit operation causing the transverter to initiate a trouble release. At this point the transverter functions to control perforation 8A to perforate the last line of the initial entry on the tape. As described in the above-mentioned Cahill patent, the last line of the initial entry includes the two digit designation of the calling trunk.

When the perforation cycle is completed, the transverter operates the recorder disconnect start relay DS, the winding of which is not shown. The DS relay operated in the recorder at its make contact DS,1 in FIG. 2 applies direct ground to the upper winding of relay 2DTK to operate the trunk charge relay TC in the trunk, FIG. 5. Trunk charge relay TC operated locks to ground and opens lead TC5 causing the release of relays 2DTK in the recorder; at its contact TC,3 relay TC removes ground from lead RC5 releasing relay 2RCK. Contacts 2RCK,1 and 2DTK,2 released and contacts DS,3 and 2DTKA,2 operated allow relay 2RD to be operated. The operation of relay TC at the back contact of its transfer contacts TC,1 opens the TM lead ground supply to the DJ5 lead. Relay 2RD operated at its back contact 2RD,3 also removes resistance battery from lead TK to the primary winding of the trunk identifier relay T− causing it to release. Relay UL in recorder 8 and relay U− in identifier 9 are released by the operation of back contact 2RD,5. The release of T− and U− identifier relays in identifier 9 causes the release of relays TA− and UA− in that circuit. Relay UA− released at its released make contact UA−,1 releases transverter relay IR.

The release of transverter relay IR through its work contacts (not shown) operates transverter relay RL (winding not shown) whose operated back contact RL,1 removes resistance battery from transverter start lead ST1. Removal of battery from lead ST1 causes the release of the transverter preference relay 3TP1 in the recorder, FIG. 3. The release of the transverter preference relay 3TP1 at its released make contact 3TP1, 2 releases transverter connector relay 3TC1. Relay 3TC1 released, at one of its work contacts (not shown) releases relay DS and at its released make contact 3TC1,2 releases relays 3CH and 3TVM. Relay 3CH released releases relay 2TVM1 which in turn releases relay 2ON. Relay 2ON released, releases relay 2DTKA which in turn releases relay 2ON1. Relay DS released, at its released make contact DS,3 releases relay 2RD. The recorder and transverter and trunk identifier circuits are now all accordingly restored to normal.

Seizure of the Recorder for Answer or Disconnect Time Entry

When a called subscriber answers a call and again when, after answer, either party causes a disconnect, the trunk carrying the call will attempt to obtain access to the recorder for the purpose of recording the time of answer or disconnect as the case may be. At the same time, the trunk's two-digit identification number will be recorded. If the recorder is not in use, relay 3CH will be normal and its back contacts 3CHO through 3CH9 in FIG. 1 will permit ground to be extended from the recorder over the CH leads to the trunk.

The trunk charge relay TC in trunk 5 was previously operated during the initial entry and locked to ground over the make contact of its transfer contacts TC,2. When the called party answers the call, a relay (not shown) in trunk circuit 5 detects the answer condition and provides an enabling ground to the winding of relay MA over a path including make contact TC,4. Relay MA operates and at its make contact MA,1 connects lead CH5 to lead DJ5 in series with the operated make contact of transfer contacts TC,1. The ground made available by the recorder on lead CH5 is now applied over lead DJ5 to operate the T− identifier relay in trunk identifier 9. Trunk 5 will then operate its associated T− identifier relay over a path including ground on lead DJ5, back contact TA−,1, the upper winding of relay T−, the back contacts T−,3 through TO,3 of the other tens-digit identifying relays, all of which should be normal, lead BT, a back contact of the TN6 relay, back contact 2RD,3 and resistance battery R6. Relay T− operated locks over its lower winding and make contact T−,4 to ground provided on lead TL1 over back contacts 2RD,2 and 2TVM1,7. Relay T− operated, at its make contact T−,5 operates relay TA−. Relay TA− operated transfers lead DJ5 to the upper winding of relay U− operating this relay. Relay U− operated at its make contact U−,1 operates relay UA−. Relay UA− operated at its make contact UA−,1 in FIG. 2 applies trunk identifier resistance battery R9 to lead IR operating identifier preference relay 2IP in the recorder. Relay 2IP is the preference relay for trunks having answer or disconnect timing entries. Relay 2IP operated, at its break contact 2IP,1 in FIG. 3, opens the operating ground path to the windings of relays 3MTP, 3TPO through 3TP1 and 3HP. These relays are the preference relays for the master timer, the transverters and the hour entry timer, respectively. Since the operating path to these relays has been opened, none of the aforementioned circuits which has not already operated and locked its preference relay can obtain access to the recorder. However, if any preference relay has operated and locked before relay 2IP operates, it will obtain access to recorder 8. Thus, during an initial entry when the recorder is being used by a transverter and relay 2IP cannot be operated by a timing entry requesting trunk (because its operating path is opened by contact 2TVM1,5) any of the other preference relays in FIG. 3 may operate and lock, thus depriving a waiting trunk of its turn in accessing the recorder. The manner in which this is remedied by relay RIP which is provided in accordance with the invention will, however, soon appear.

Relay 2IP operated, at its make contact 2IP,4 (FIG. 1) completes an operating path for relay OTK which may be traced in trunk 5 from resistance battery and the winding of relay RC, make contact MA,6 to lead OT, make contacts TL−,4 and UA−,4 in trunk identifier 9 to lead OT, a back contact of relay TN, back contact DS,5, the winding of relay OTK, a back contact of relay 3HPA, resistor M, back contact 2ON,5 and make contact 2IP,4 to ground. Relays OTO and RC which are marginal do not operate because of resistance M.

Figure 3:
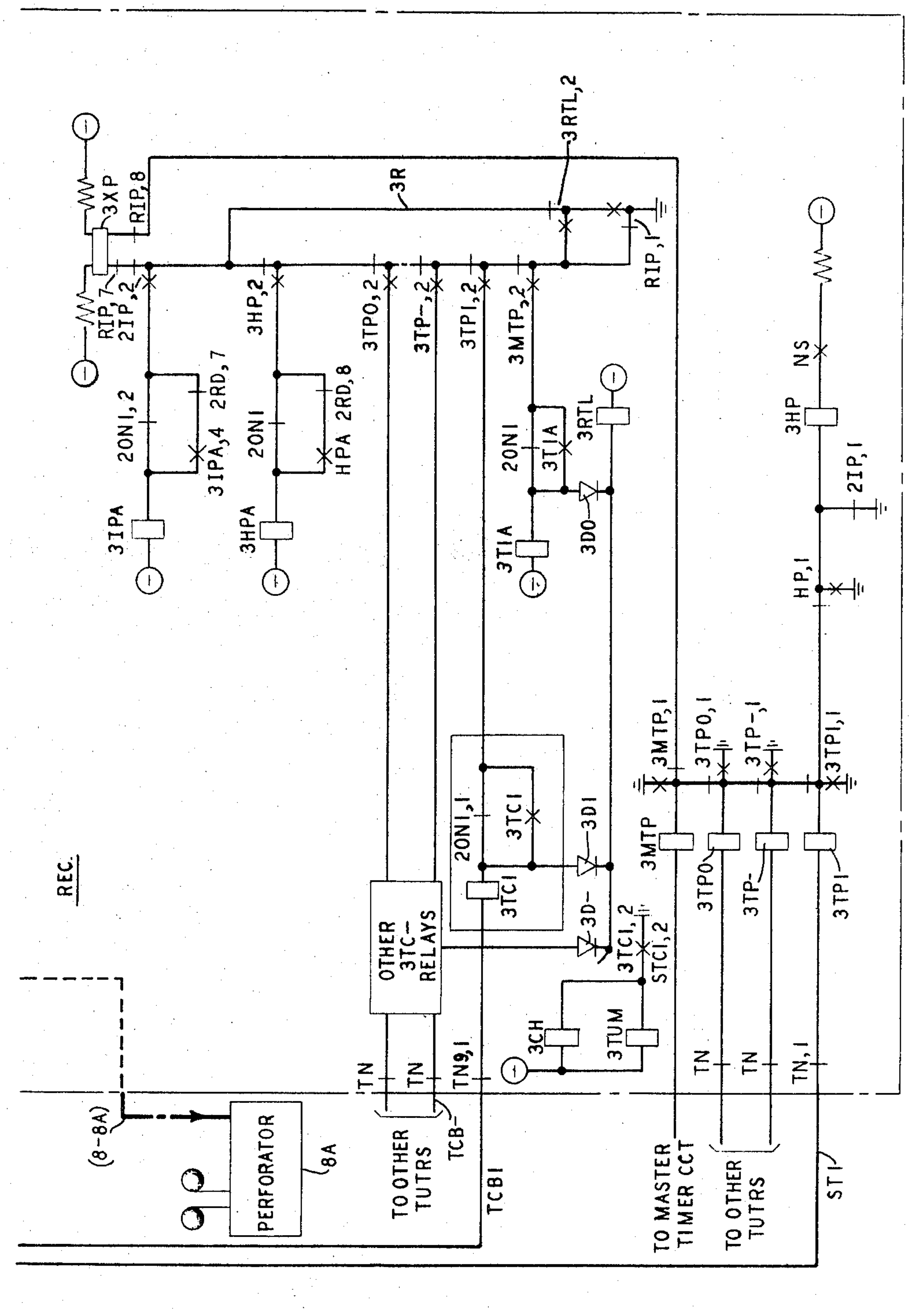
FIG. 3 shows the automatic message accounting tape perforator and the remainder of the recorder circuit modifications.
Figure 4:
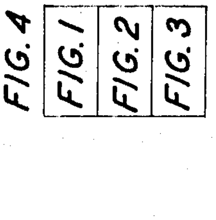
FIG. 4 shows how

When all the preference relays in FIG. 3 are normal, ground is applied over back contact RIP,1 and back contacts 3MTP,2, 3TP1,2 through 3TPO,2, back contact 3HP,2, make contact 2IP,2, back contact 2ON1,2 to the winding of relay 3IPA which operates. Relay 3IPA operated, at its make contact 3IPA,1 in FIG. 2 operates relay 2ON which in turn operates relay 2ON1. Relay 2ON operated at its make contact 2ON,3 in FIG. 1 completes an operating path for relay UL in series with the lower winding of identifier relay U− in trunk identifier 9. Relay UL operates and at its work contacts (not shown) completes operating paths to other relays in recorder 8 which indicate that the GU lead is continuous through the trunk 9. Relay 2ON operated, at its make contact 2ON,5 in FIG. 1 transfers the ground for maintaining relay OTK operated to the path including back contact 2RD,5.

On a normal timing entry the resistance battery which trunk 5 applies to the OT lead enables relay OTK in recorder 8 to operate. Relay OTK operated and relay OTO normal signify via their respective work contacts (not shown) to other circuits (not shown) in recorder 8 that a normal timing entry is involved. However, if the called party should disconnect before the calling party, relay RL (winding not shown) in trunk 5 will operate and its make contact RL,5 will provide a low resistance ground to the winding of trunk relay RC causing it to operate. Trunk relay RC operates and locks to ground in series with its make contact RC,1 and make contact MA,2 thus grounding lead OT. Since trunk 5 now applies ground instead of battery to lead OT, relay OTK in recorder 8 will not operate but instead relay OTO will operate. Relay OTO operated and relay OTK normal indicate via their respective work contacts, not shown, to the remaining circuitry of recorder 8 that the timing entry was initiated by called party disconnect.

Relay 3IPA operated, at its make contact 3IPA,1 in FIG. 2 applies ground in series with back contact DS,2 and the C resistor to the lower winding of relay 2DTK. From this point the operating path for relay 2DTK continues over make contact 3IPA,2, back contact 3TVM,6 and a back contact of relay TN2 to lead RC. Trunk 5 applies resistance battery to the other end of this RC lead which path may be traced from resistance battery in trunk 5 in FIG. 1, make contact MA,3, make contact TC,3, and a make contact of relay S2. Relay 2DTK operates over its lower winding, indicating via others of its work contacts (not shown) to the recorder that lead RC is continuous.

With the aforementioned relays 3IPA, 2DTK and either OTK or OTO operated, relay 2DTKA is operated over a path (not shown), one of whose contacts (not shown) connects the work contacts of the operated T− and U− identifier relays from trunk identifier 9 to cable (8–8A) to control the perforation of the tape for recording of the timing entry.

At the conclusion of perforation, recorder relay LC (winding not shown) is operated, one of whose contacts LC,1 in FIG. 2 applies a low resistance ground to the upper winding of relay 2DTK. This ground is applied through the winding of relay 2DTK, make contact 3IPA,2 and back contacts 3TVM,6 and TN2 to lead RC. Appearance of low resistance ground on lead RC causes relay TC in trunk 5 to release. The release of trunk relay TC causes the removal of ground from lead DJ5 and lead RC5.

If a trunk awaiting access to the recorder to record the time of disconnect cannot obtain such access within 2 to 5 seconds, a timing relay (not shown) in trunk 5 closes contact TR shunting the winding of relay MA. The release of relay MA at its released make contact MA1 removes ground from lead DJ5 and at its released make contact MA,6, removes the resistance battery that would normally be applied to lead OT and at its released contacts MA,5 removes resistance battery from lead RC5.

The operation of recorder relay LC (not shown) at others of its work contacts (not shown) operates circuits which result in the operation of relay DS (winding not shown), one of whose contacts DS,3 completes an operate path for relay 2RD which operates. Relay 2RD operated at its operated back contact 2RD,2 in FIG. 2 opens the locking path to the winding of the operated T− relay in trunk identifier 9. Operated back contact 2RD,5 opens the locking path in lead GU to the winding of identifier relay U−. Both relays T− and U− release. Relay T−, at its released make contact T−,5 releases relay TA−. Relay 2RD operated at its back contact 2RD,7 in FIG. 3 opens the locking path for relay 3IPA which releases. Relay U− released at its released make contact U−,1 releases relay UA−. Relay UA− at its released make contact UA−,1 in FIG. 2 releases the identifier preference relay 2IP in the recorder. Relay 3IPA released at its released make contact 3IPA,1 in FIG. 2 releases relay 2ON. Relay 2ON released releases relay 2DTKA. The release of relay 2DTKA at its released make contact 2DTKA,2 causes the release of relay 2RD. With relay 2RD released and relays 2DTKA and 2ON released, relay 2ON1 releases. This returns the recorder to normal.

Operation of Preference Reservation Relay

From the foregoing description of the operation of this system on an initial entry and on the answer and disconnect timing entries, it is seen that the release of relay 2RD is effective at the completion of a timing entry directly to release relay 2ON1, whereas, at the completion of an initial entry, there is an interval between the release of relay 2RD and the release of relay 2ON1. In this interval it would be possible for a timing entry requesting trunk to operate its T− identifier relay in identifier circuit 9 and yet be deprived of access to the recorder by a subsequently operating transverter preference 3TP− relay in FIG. 3. This could happen because a transverter preference relay can be operated so long as contact 2IP,1 in FIG. 3 is normal and this contact will be normal until relay T− operated relay TA− which in turn allowed relay U− to operate which in turn operated relay UA−. During the interval between the operation of relay T− and relay 2IP, one of the transverter preference relays could preempt a timing entry requesting trunk from obtaining access to recorder 8.

In accordance with my invention, I provide a preference reservation relay RIP in FIG. 1 which may be operated by a timing entry requesting trunk during the time that a recorder is finishing its work for a transverter on an initial entry. The RIP relay which in one illustrative embodiment is a fast operating wire spring relay having an operate time of 4.9 milliseconds (compared to 12 milliseconds for relay T− and relay 2ON1) is connected so as to be effective if a timing entry requesting trunk operates its T− identifier relay in trunk identifier 9 following the release of relay 2RD and prior to the release of relay 2ON1 during the completion of the aforementioned initial entry. In the illustrative system, relay 2ON1 is a conventional U-type relay whose release time is approximately 7 milliseconds. Therefore, when recorder 8 is completing its work on an initial entry, the release of relay 3CH, which restores the continuity of the CH leads to the timing entry requesting trunks, permits a T− trunk identifier relay and the newly-added preference reservation relay RIP to operate. Although the T− identifying relay could be operated at this time in the prior system, as soon as the 2ON1 relay released its back contact 2ON1 in FIG. 3 would complete the operating path for any 3TC− connector relay whose 3TP− transverter preference relay had operated and locked while relay 2IP was normal. Relay 2IP in the prior system would remain normal during the interval starting with the operation of relay T− and continuing through the operation of relays TA−U−AND UA− in sequence. With the addition of preference reservation relay RIP in the recorder of FIG. 1, the delay between the operation of relay T− and 2IP will no longer permit a timing entry requesting trunk to be deprived of access to the recorder by the operation of a 3TP− relay. Relay RIP will operate simultaneously with the operation and locking of the T− identifier relay. At the make contact of its transfer contacts RIP, 1 in FIG. 3 relay RIP prepares an enabling ground in the operating path for relay 3IPA over bridging conductor 3R. Bridging conductor 3R bypasses the back contacts 3MTP,2 and 3TP1,2 through 3TPO,2 of the transverter preference relay as well as back contact 3HP,2 of the hour entry preference relay. At the back contact of transfer contacts RIP,1 the enabling ground to the aforementioned transverter preference relay contacts is discontinued. Simultaneously, relay RIP at its make contact RIP,2 in FIG. 1 connects resistance battery to the winding of relay OTK and at its make contact RIP,6 completes the locking path in lead GU for the U− relay. Relay RIP at its make contact RIP,3 in FIG. 2 provides resistance battery from voltage divider RA, RB in series with back contact 2DTKA,5 and make contact 3IPA,2 to the left-hand side of relay 2DTK. This resistance battery is effective in the same manner as the resistance battery which would have been applied over lead RC by trunk 5 if trunk 5 had not timed out after operating its T− and U− identifier relays. It will be recalled that on a timing entry trunk 5 normally provided resistance battery to lead RC which operated relay 2DTK over the path from resistance battery on lead RC, a back contact of relay TN2, back contact of transfer contacts 3TVM,6, make contact 3IPA,2, the lower winding of relay 2DTK, resistance C, back contact DS,2 and make contact 3IPA,3 to ground. If trunk 5 times out, relay 2DTK will now nevertheless operate because of resistance battery made available over back contact 2DTKA,5. It should be noted that prior to the operation of relays 3IPA and RIP, there will be no current through voltage divider RA and RB. After relay RIP operates and prior to the operation of relay 2DTKA, current will be drawn from the RA, RB voltage divider to operate relay 2DTK. No current, however, will be drawn through the voltage divider RA and RB on an initial entry because relay RIP is prevented from operating by the operation of back contact 2TVM1,7 in FIG. 1 and relay 3IPA does not operate.

It will be recalled that trunk 5 normally caused the release of the operated 2DTK relay in recorder 8 by trunk relay TC releasing and removing resistance battery from lead RC. With the provision of voltage divider RA and RB however, relay 2DTK will, on a trunk time out, now be released by the operation of back contact 2DTKA,5. However, when the trunk operates normally and does not time out, the operation of contact 2DTKA,5 does not immediately release relay 2DTK which remains operated until released in the normal manner by the trunk. Relay 2DTKA is operated, as previously described, after the operation of relay 2DTK and either of checking relays OTO or OTK over a path including ground, make contact 2DTK,1, make contact 3IPA,5, transfer contacts OTK,1 and OTO,1 and the winding of relay 2DTKA to battery.

In FIG. 3 relay 3RTL is connected via respective diodes 3D− to the windings of the transverter connector 3TC− relays. In the event that no trunk was waiting to have a timing entry recorded and some transverter does operate its 3TP− transverter preference relays for an initial entry, relay 3RTL will operate when the corresponding transverter connector 3TC− relay operates. In the event that some timing entry requesting trunk should now operate its T− relay, the operation of relay RIP transfer contacts RIP,1 will be overridden by transfer contacts 3RTL,2 which maintain a holding ground path for the operated 3TC− relay and also prevent operation of relay 3IPA. The operation of break contacts 3RTL,1 in FIG. 1 will then cause the release of relay RIP.

Accordingly, I have shown an arrangement for improving the operation of automatic message accounting apparatus under heavy traffic conditions according to which a waiting timing entry requesting trunk will always be assured of access to the recorder as soon as the recorder finishes working for a transverter on an initial entry and according to which timing entry requesting trunks and transverters will be accorded normal preference access to the recorder when the recorder finishes working on a timing entry. I achieve this in part by providing a fast operating preference reservation relay which is operated immediately upon a trunk operating the first of its identifier relays in the identifier circuit, which prevents other circuits from preempting access to the identifier while the remaining ones of that trunk's identifier relays are being operated and which prevents loss of a timing entry should a timing entry requesting trunk time out after operating its identifier relays.

It is to be understood that the embodiments described herein are merely illustrative of the principles of the invention. Various modifications may be made thereto by those skilled in the art without departing from the spirit and scope of the invention.

I claim:

1. In an automatic message accounting system having a plurality of trunks and which employs a trunk identifier to furnish the identity of a call-carrying trunk to a recorder at the inception of a call and again when the times of answer and disconnect are to be recorded, the combination comprising:

means connected to said identifier and operative when said recorder is in use at the inception of a call carried by a first one of said trunks for detecting the presence of a timing entry request from a second one of said trunks;

inhibiting means controlled by said detecting means for preventing said recorder from thereafter being seized for use at the inception of a call over another one of said trunks; and enabling means controlled by said detecting means for permitting said second one of said trunks to obtain access to said recorder when said recorder is no longer in use on said call carried by said first one of said trunks.

2. In an automatic message accounting system according to claim 1 in which said timing entry requesting trunks automatically cancel such request after waiting a predetermined interval for access to said recorder, said combination further comprising means controlled by said detecting means for temporarily registering the identity of said second one of said trunks in said trunk identifier after said trunk has made and canceled such request after said predetermined interval.

3. In an automatic message accounting system according to claim 1, the combination wherein said trunk identifier includes a plurality of identifier relays, wherein said second one of said trunks makes said timing entry request by operating said identifier relays in sequence, wherein said recorder includes an identifier preference relay operated by the last operated one of said identifier relays, and wherein said inhibiting means and said enabling means are operative during the interval between the operation of the first sequentially-operated one of said identifier relays and the operation of said identifier preference relay in said recorder.

4. In an automatic message accounting telephone system having a plurality of trunks and transverters, a trunk identifier and a recorder for recording trunk identity at the initiation, answer and disconnect of a call carried by any of said trunks, the combination comprising:

access circuit means normally operative when said recorder is idle for permitting said identifier or one of said transverters to be connected to said recorder;

means operative responsive to one of said trunks requesting access to said recorder for recording an answer or disconnect time for one of said telephone calls;

first means controlled by said responsive means while said recorder is disconnecting from one of said transverters for thereafter preventing said access circuit means from connecting any other of said transverters to said recorder; and second means controlled by said responsive means for permitting said access-requesting one of said trunks to obtain access to said recorder when said recorder and said one transverter are disconnected.

5. In an automatic message accounting system having a plurality of trunks, a trunk identifier circuit, a plurality of transverters, and a recorder, a preference reservation relay, means for operating said reservation relay responsive to the condition obtaining when both the recorder has been connected to one of said transverters but before released of said recorder and a trunk having a timing entry seizes said trunk identifier circuit, and means including contacts of said reservation relay for preventing connection of said recorder to a second transverter upon said release of said recorder by the priorly connected transverter.

6. In an automatic message accounting system, the combination in accordance with claim 5 wherein said trunk identifier includes identifier relays for storing the identity of a connected trunk, means including further contacts of said reservation relay for locking the identifier relays upon time out of a trunk connected to one of said trunk identifiers.